United States Patent [19]

Melamed

[11] 4,206,350
[45] Jun. 3, 1980

[54] ATOMIC AND MOLECULAR ISOTOPE SEPARATION

[75] Inventor: Nathan T. Melamed, Pittsburgh, Pa.

[73] Assignee: Westinghouse Electric Corp., Pittsburgh, Pa.

[21] Appl. No.: 873,817

[22] Filed: Jan. 31, 1978

[51] Int. Cl.$^2$ ............................................. B01D 59/44
[52] U.S. Cl. .................................. 250/281; 250/282; 250/423 P
[58] Field of Search ..................... 250/281, 282, 423 P

[56] References Cited

U.S. PATENT DOCUMENTS

| | | | |
|---|---|---|---|
| 3,937,956 | 2/1976 | Lyon | 250/423 P |
| 3,987,302 | 10/1976 | Hurst et al. | 250/423 P |

OTHER PUBLICATIONS

"Isotope Separation Using Laser Light", by Hodgson et al., IBM Tech. Discl. Bull., vol. 17, No. 11, Apr. 1975, pp. 3501, 3502.

Primary Examiner—Harold A. Dixon
Attorney, Agent, or Firm—Edward L. Levine

[57] ABSTRACT

Method and apparatus for selectively exciting and separating a selected isotope or molecule from a mixture of isotopes or molecules, particularly useful in separation of isotopes of uranium and other heavy metals. The method serially includes placing the mixture of isotopes in an excited gaseous state, selectively de-exciting one or more isotopes of the mixture, and subsequently permanently separating the de-excited and excited isotopes.

16 Claims, 5 Drawing Figures

ATOMIC AND MOLECULAR ISOTOPE SEPARATION

BACKGROUND OF THE INVENTION

1. Field of the Invention

This invention relates to isotopic and molecular separation, and in particular provides method and apparatus for generally exciting and selectively de-exciting preselected species preparatory to physical separation.

2. Description of the Prior Art

For many applications it is desirable to separate selected atomic species (isotopes or molecules) from a mixture including the species. Typically the mixture includes species which have substantially similar characteristics and, accordingly, sophisticated forms of differentiation and separation are required.

Among the applications for which such fine separation is required is the production of fissionable isotopes for nuclear reactor utilization. Among the most common examples of isotopic separation is the division of the uranium-235 isotope from other uranium isotopes, particularly uranium-238. In the past the isotopic separation has been based primarily upon slight chemical or mass differences, involving in most cases a complex, costly cascading system, such as a diffusion network, which requires large amounts of input energy.

More recently optical systems have been proposed which utilize selective photoexcitation and/or ionization of the desired isotope or molecule in preference to other species as a basis for differentiation prior to permanent separation. It is generally known that a molecule or atom in an excited state has different physical properties and chemical properties from a similar but unexcited species. These differences form the basis for a number of the proposed methods for separating isotopes. While such systems hold much promise as improvements over mass separation, they are not without deficiences. Most notably, because the differences in mass and electronic levels among related isotopes and vibrational and rotational frequencies among related molecules are quite small, as are the differences in optical wavelengths, a highly monochromatic source is generally required for selective electronic excitation. As a practical matter lasers prove to be the principal source for provision of sufficiently monochromatic radiation with sufficient power to yield useful separation. Consequently, recently proposed systems utilize an external laser to irradiate an isotopic mixture of atoms or molecules. Since the laser must provide a frequency corresponding precisely to the optimum frequency for exciting the desired isotope as opposed to other isotopes in the mixture, tunable lasers must be utilized. Although tunable lasers exist, they are generally inefficient, relatively difficult to use, expensive and of relatively low power. Furthermore, the absorption of the laser radiation by the isotopic or molecular medium can also involve serious losses, further reducing the overall efficiency for selective excitation. Also, because the isotope shift differs in magnitude for the different electronic levels upon which selective photoexcitation is based, it is often difficult to find suitable compounds which combine a usable isotope shift with a physical state, preferably gaseous, suitable for use in separation processes.

It is therefore desirable to further improve upon selective isotope excitation and separation processes, particularly to provide systems of increased efficiency, lower cost, power and complexity, and adaptable to a wider variety of compounds than heretofore obtainable. It is further desirable to provide these beneficial results from individual components and procedures existing in today's technology.

SUMMARY OF THE INVENTION

This invention provides substantially improved method and apparatus for selective excitation and separation of isotopic mixtures of atoms or molecules which improves upon power requirements, process efficiencies and system complexity, further being adaptable to a wide range of compounds.

The system includes placing substantially the entire isotopic mixture in an excited gaseous phase. Since selective excitation is not required, the power requirements for the excitation are relatively small and can be performed in a variety of manners including electric discharge, optical excitation, and simple combustion, or exothermic chemical reactions in which excitation is provided merely by thermal effects.

Subsequent to excitation, one or more species of the isotopic mixture are selectively de-excited. The de-excitation can be based upon stimulated emission, or amplified spontaneous emission thereby requiring a relatively small power input. De-excitation can be performed by means of an external laser or by well-known processes such as providing optical feedback by means of external resonators. Isotopic species can be selectively de-excited by incorporating in the optical feedback optically selective positive feedback, selective loss filters, absorption cells or Fabry-Perot etalons. In one sense the excited mixture, substantially constituting an inverted population of each species, can be viewed as its own lasing medium. De-excitation can be of the desired isotope or molecule, such as uranium-235, such that it is the only species in the de-excited state, or, alternatively, the other species in the mixture can be de-excited, leaving only the desired species in the excited state.

This relatively simple manner in which the desired isotopic species is differentiated from the other atoms or molecules in the isotopic mixture is followed by permanent separation by any of a number of methods well known in the art. These can include selective irradiation so as to ionize the excited atoms or molecules, preferential chemical reactions, and magnetic and electric field means, among many others.

This advantageously simplified method of mixture excitation, selective de-excitation, and subsequent permanent separation can be performed with state of the art apparatus in a continuous single cell or a series of individual structures. Because each of the processes described herein are less than completely efficient, it is to be understood that reference to the term separation and the like refer to increasing the concentration of a particular isotope with respect to the feed concentration.

BRIEF DESCRIPTION OF THE DRAWINGS

The advantages, nature and additional features of the invention will be better understood from the following description, taken in connection with the accompanying drawings, in which.

DESCRIPTION OF THE PREFERRED EMBODIMENTS

Figure 1:
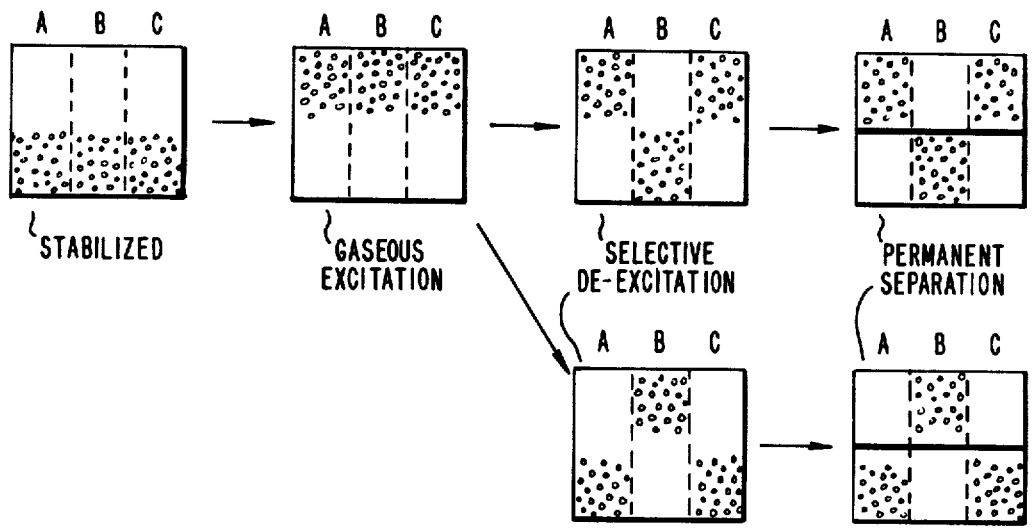
FIG. 1 is a schematic illustration of the primary process steps of this invention.

Referring now to FIG. 1 there is illustrated, in simplified fashion, the basic steps of this invention. The figure represents sequential characteristics of an isotopic mixture of atoms or molecules, for example, a mixture of isotopes "A", "B", and "C". The isotopes are shown separated by dashed lines although in actuality mixed. In the left-hand block the isotopes are represented as being in a ground, or generally unexcited state. Through any of a number of means well known in the art the mixture is converted to the gas phase in a manner that creates a large inverted population of isotopic species A, B and C. The excited states of the isotopic species are represented in the second block of FIG. 1. Although a complete inversion is not required, the greater the inversion, the larger the separation factor is likely to be. Next, a selected isotope or isotopes is de-excited, as represented by de-excited isotope "B" in the third block of FIG. 1. And, through means well known in the art, subsequent to selective de-excitation the desired isotope, "B" in this example, can be permanently separated from the remaining components of the mixture. The same result, separation of isotope "B", can also be achieved through selective de-excitation of isotopes "A" and "C", leaving isotope "B" in the excited state, as shown by the lower path of FIG. 1.

Figure 2:
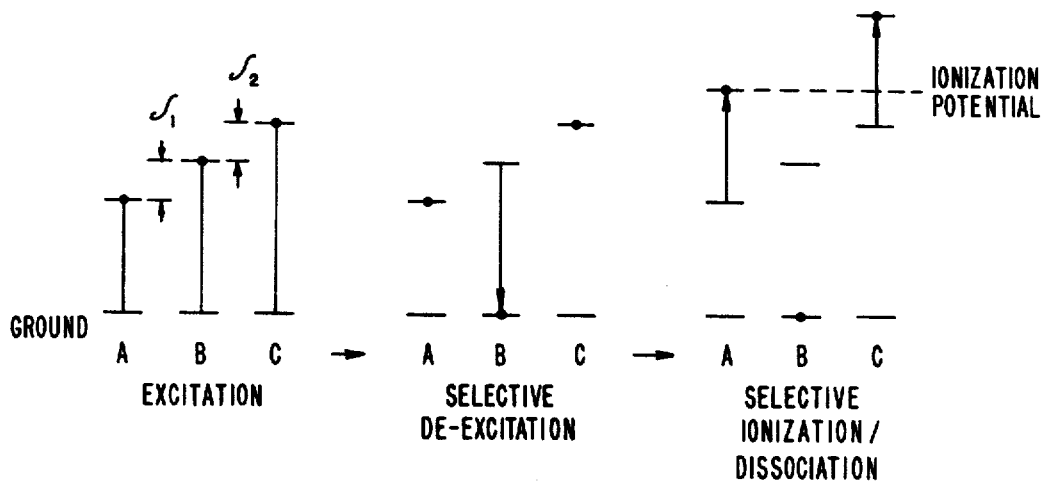
FIG. 2 is a schematic representation of the energy states of three isotopes in accordance with one embodiment of this invention.

A process similar to that exemplified in FIG. 1 is illustrated in another manner in FIG. 2. The optical ground state is represented as the lower line in the Figure, and the upper lines as respective excited states of isotopes "A", "B" and "C". As shown, the isotopes are initially excited to states separated by isotope shifts $\delta_1$ and $\delta_2$. Isotope "B" is then selectively de-excited back to the ground state. The Figure further illustrates one procedure toward permanent separation, the selective raising of isotopes "A" and "C" to or above their ionization potential in preference to isotope "B", which can remain in the optical ground state.

Each of the main process steps thus outlined can be performed with means exciting in today's technology, although technological improvements are expected to enhance the resolution and final separation efficiency. For example, general excitation of the isotopic mixture can take place in a number of relatively simple manners. It is well known that gas phase reactions can produce either molecules or atoms in excited states. The molecules or atoms often constitute an inverted population among appropriate energy states and, quite frequently, the inversion can be initially one hundred percent as formed. In addition, a large number of elements and compounds can be made to undergo gas phase reactions, forming reaction products in the gas phase which might otherwise be difficult to obtain as a vapor. Accordingly the effects of simple combustion, discussed further hereinafter with respect to FIG. 5, can be utilized to place the isotopic mixture in an excited gaseous phase.

Similarly, many chemical reactions resulting in gaseous reaction products are sufficiently exothermic such that the heat release places the products in a sufficiently excited state. Excitation can also be performed by many other procedures, such as photoexcitation by light, excitation by particles such as neutrons, electrons and fission fragments, and by electrical discharge, among other suitable means.

Selective de-excitation of the desired isotope, or all species except the desired isotope, can also be performed by a number of means. Optical feedback, for example, can be provided at an optical wavelength which causes the selected species to de-excite preferentially through stimulated emission. This can be accomplished, for example, by making a Fabry-Perot etalon a component of an optical cavity. These etalons can be made resonant at a selected wavelength, and can also be made to have extremely narrow predetermined line widths, thereby making available a matching of resonant frequency and line width to the optical transition frequency of the desired species.

Where it is desired to provide feedback for all species except the desired one, leaving that one species in the excited state, a selective loss can be placed in a broad band reflective optical cavity through such means as a narrow band reject interference filter. Alternatively a selective loss can be introduced into the optical cavity by an absorption cell. Under the appropriate conditions, well known in the art, the absorption cell can be a sharply tuned narrow band filter comprising the same compound as the desired species, but without an inverted population. Such a cell can automatically provide selective wavelength attenuation if the optical transition desired is to the ground state of the atom or molecule.

Also, selective stimulated emission of a substantially inverted population can be produced by injecting monochromatic radiation of the desired frequency from an external source such as a laser. The laser power required to effect stimulated emission is here relatively small because the inverted medium acts as its own amplifier of stimulated emission. This procedure can prove useful where the overall gain of the reaction cavity is positive but below the threshold gain for stimulated emission. Under these conditions lasing of a large volume can be induced by means of a low power external laser tuned to the proper frequency.

Subsequent to selective de-excitation through stimulated emission or amplified spontaneous emission, physical separation or stabilization to permanently separate the desired isotope can be performed by a number of procedures, either physical or chemical. For example, the isotopic mixture can be irradiated with a wavelength so that the excited atoms are ionized, as illustrated in FIG. 2, and separated by electric or magnetic field means. Additionally, the excited atoms or molecules can be made to undergo a preferential chemical reaction which the unexcited species do not undergo, or which proceeds with respect to the unexcited species at a lower rate. Also, for those species having a magnetic moment which is different in the excited state than in the ground state, physical separation can be produced, for example, by the application of an appropriate magnetic field. Many other well-known separation processes are suitable once selective de-excitation has been performed.

EXAMPLE

Figure 3:
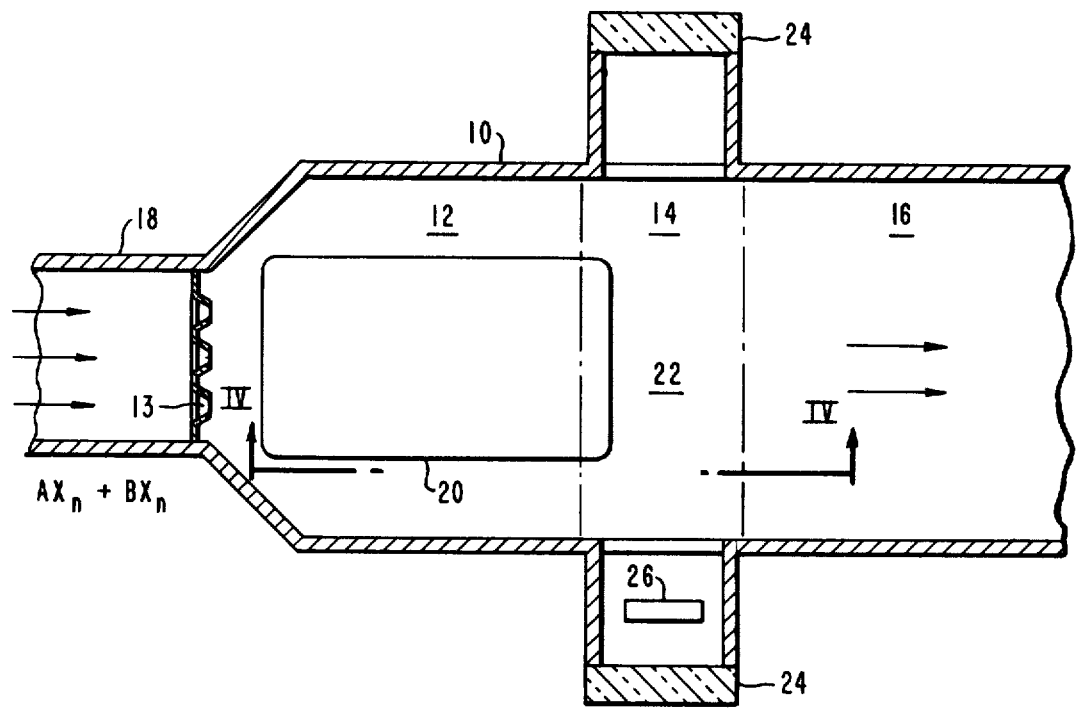
FIG. 3 is a simplified plan view of an isotopic separation apparatus in accordance with this invention.
Figure 4:
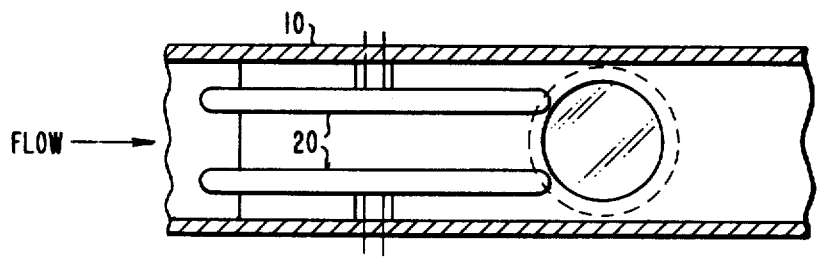
FIG. 4 is a section view taken at IV—IV of FIG. 3.

FIGS. 3 and 4 schematically illustrate one embodiment for implementation of the invention. A separation vessel 10 includes a first region 12 for general excitation, a second region 14 for selective de-excitation and a third region 16 for permanent separation. A gaseous mixture is directed through means for inletting the mixture, such as the inlet nozzle 18, into the excitation region 12. The gas, for exemplary purposes, can be regarded as constituting a mixture of molecules $AX_n$ and $BX_n$, where A and B are isotopes of the same element and $X_n$ is another element or compound. Upon entry of the gaseous mixture into the excitation region 12 the molecules are excited to a metastable state which constitutes inversion or near inversion by means of an electric discharge produced by electrodes 20. The excited molecules then flow, as a result of a pressure differential induced along the length of the vessel 10, to the selective de-excitation region 14 including an optical cavity 22. Selective de-excitation is achieved by utilization of resonators 24 which are chosen so that they provide optical feedback at a frequency or frequencies corresponding to the inversion frequencies of $AX_n$ but not of $BX_n$. An absorption cell 26 provides selective absorption at optical frequencies characteristic of the inversion of $BX_n$ further reducing the probability of stimulated emission at frequencies of $BX_n$ while allowing $AX_n$ to be de-excited. The excitation 12 and de-excitation 14 regions can be separate vessels, and can also overlap or be contiguous.

Subsequent to selective de-excitation of $AX_n$ the isotopic mixture passes into the region 16 for permanent separation by any of a number of methods including those discussed above. This secondary processing can include two steps, first separating molecules $AX_n$ from molecules $BX_n$, and subsequently separating A from $X_n$.

For purposes of illustration, we may consider the separation of the isotopes of chlorine, $Cl^{35}$ and $Cl^{37}$. When $Cl_2$ and $H_2$ (hydrogen) react to form two molecules of HCl, (hydrogen chloride) they do so exothermally, producing HCl molecules which are vibrationally highly excited. These molecules decay to their vibrational ground states by a process of photoemission. The emitted photons lie at approximately 3.46 μm and correspond to a transition between vibrational levels $v=n$ and $v=n-1$. In the case of HCl, the difference in the emitted frequencies of the $v=1$ to $v=0$ of $HCl^{35}$ and $HCl^{37}$ is 4.00 cm$^{-1}$ or about 25 Å. This difference in frequency is large enough to make possible optical resonators which are reflecting at the frequency of one of the isotopic species of HCl but not the other. Use of such resonators would cause rapid de-excitation of that one of the molecular species for which the reflectivity is high by providing optical feedback at the appropriate frequency, but not of the other species. Alternatively, a broad band high reflectivity resonator could be used, which in principle is capable of de-exciting both molecular species but optical feedback at frequencies belonging to one of the species is prevented by means of a selective absorber. This selective absorber may be either a narrow band filter or a gas cell containing only the desired molecular species of HCl. The filter is inserted within the optical cavity.

In one embodiment of this invention exemplary gases $H_2$ and $Cl_2$, the latter consisting of a mixture of $Cl^{35}$ and $Cl^{37}$, are inserted into the excitation region 12 through the inlet nozzles 18. Within the region 12, reaction between $H_2$ and $Cl_2$ occurs to form $HCl^{35}$ and $HCl^{37}$ in highly vibrationally excited states. This mixture of excited isotopic species flows into the region 14 which comprises the optical cavity. Resonators 24 are tuned to provide optical feedback mainly at the frequencies of transitions belonging to either $HCl^{35}$ or $HCl^{37}$, but not to both.

Conversely, the filter 26 may be used in order to prevent optical feedback for one of the isotopic species. In either case, one of the isotopic species is vibrationally de-excited while the other remains preferentially in the excited state. Thus, the two isotopic species are now in differing states of excitation whereupon they may now be further processed to provide a more permanent difference in state or chemical composition. Such further processing may be accomplished by methods well known in the art. For example, the mixture of excited and de-excited molecules may be irradiated with light at a wavelength sufficient to dissociate the excited molecules, but not sufficient to dissociate the unexcited molecules because of the reduced internal energy.

EXAMPLE

As a further illustration, we may consider the separation of $O^{16}$ and $O^{18}$, which are the most abundant of the natural isotopes of oxygen. In the present modification we utilize the gas $CO_2$, and for simplification we consider an isotopic mixture of $C^{12}O_2^{16}$ and $C^{12}O_2^{18}$. Table I below lists the wavelengths of $C^{12}O_2^{16}$ and $C^{12}O_2^{18}$ for several P-branch rotational lines of the (00°1) to (10°0) vibrational transition. Laser action has been observed on these transitions.

TABLE I

P-Branch Transitions of the (00°1) to (10°0) Vibrational Band of $CO_2$

| P | Wavelength in μm $C^{12}O_2^{16}$ | $C^{12}O_2^{18}$ |
|---|---|---|
| P(18) | 10.571 | 9.341 |
| P(20) | 10.591 | 9.355 |
| P(22) | 10.611 | 9.369 |
| P(24) | 10.632 | 9.383 |
| P(26) | 10.652 | 9.397 |

In the present modification, the isotopic mixture of $CO_2$ molecules are combined with $N_2$ (nitrogen) and subjected to an electric discharge so as to populate the upper (00°1) levels of both $C^{12}O_2^{16}$ and $C^{12}O_2^{18}$ and to produce an inverted population with respect to the ground state in a manner well known in the art. This is done, for example, in region 12 of FIG. 3 by electrodes 20. The excited gas mixture flows into region 14 which constitutes the optical cavity. In the present example, resonators 24 are considered as tuned to one or more of the P lines of $C^{12}O_2^{16}$ but not corresponding to any of the transitions of $C^{12}O_2^{18}$. By this process $C^{12}O_2^{16}$ molecules are selectively de-excited, while molecules of $C^{12}O_2^{18}$ may substantially remain in their excited state. It should here be noted that optical feedback at any one of many of the P lines of the transitions of $C^{12}O_2^{16}$ may serve to de-excite the molecule. Further, the large differences in wavelengths of $C^{12}O_2^{16}$ and $C^{12}O_2^{18}$ as illustrated in Table I make selective de-excitation of one of the isotopic species in preference to the other relatively apparent. It is also apparent that alternatively the $C^{12}O_2^{18}$ molecules could have been selectively de-excited, leaving the $C^{12}O_2^{16}$ in the excited state. Having selectively de-excited one of the isotopic species, the excited isotopic species can be acted upon in any one of a number of ways known in the art, for example, by irradiating with light which results in selective dissociation of the molecule, as in the previous example.

EXAMPLE

It will also be apparent that the same principle can be applied to separate the isotopes of carbon, for example $C^{12}$ and $C^{13}$ rather than of oxygen by utilizing the appropriate isotope shift of the stimulated emission frequencies, e.g., of $C^{12}O_2^{16}$ and $C^{13}O_2^{16}$. These frequencies are well known and will not be tabulated here. For purposes of illustration, presented is an alternate means for obtaining inverted populations of the two species that differs from the previous example. This example illustrates the use of a combustion reaction as a means for inverting the population. Apparatus for the exemplary system is shown in FIG. 5.

Figure 5:
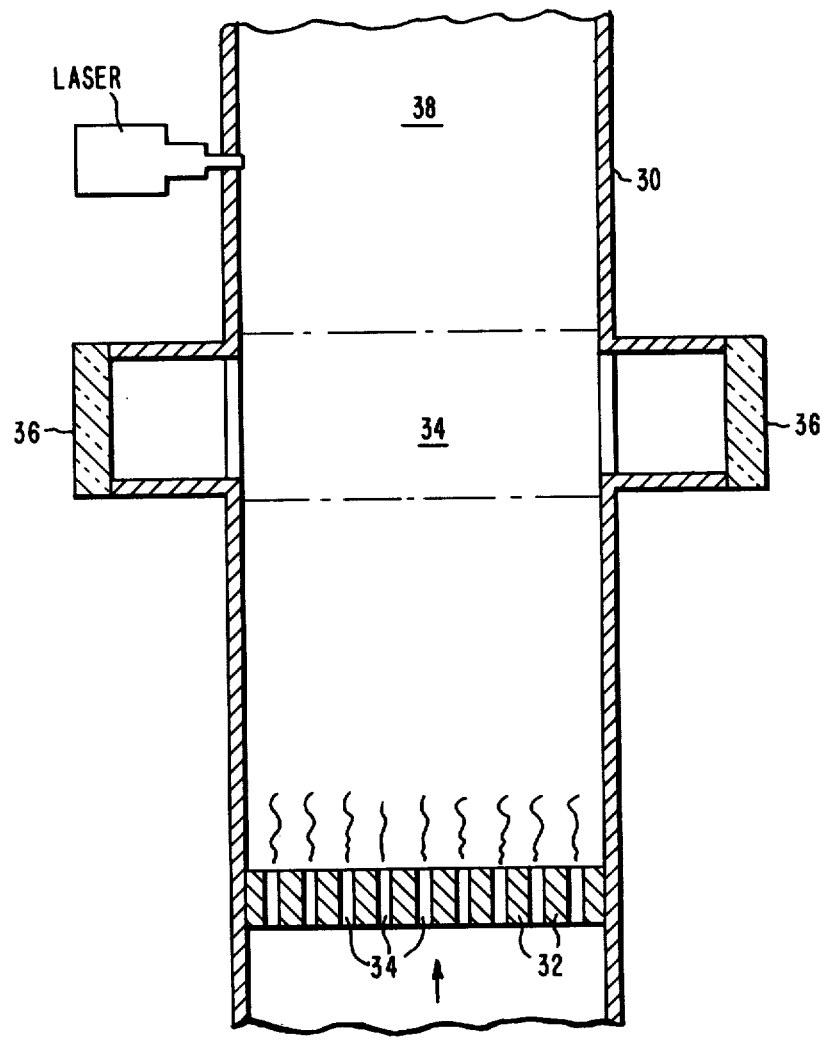
FIG. 5 is a simplified elevation view, in section, of another separation apparatus in accordance with this invention.

Referring to FIG. 5, a container 30 includes a burner 32 equipped with means for introducing a combustant, in this case $O^{16}$ and fuel as a natural mixture of carbon which consists primarily of the isotopes $C^{12}$ and $C^{13}$. The carbon may be introduced as a fine powder. The heat of reaction for $C + O_2 \rightarrow CO_2$ is $-94.05$ kcal/mole, equivalent to 4.097 eV/molecule, which is more than sufficient to excite the $CO_2$ to the (00°1) levels of $CO_2$.

The excited molecules of $CO_2$ then pass into chamber 34, between resonators 36 which are designed to preferentially de-excite one of the isotopic species of $CO_2$ as in the previous example. The remaining steps follow according to the previous example in which the separation of oxygen molecules was illustrated.

EXAMPLE

For the separation of uranium-235 and uranium-238, the fuel can consist of uranium vapor or finely dispersed uranium powder. The combustant can be a halogen, such as fluorine ($F_2$), chlorine ($Cl_2$), bromine ($Br_2$), iodine (I) or oxygen ($O_2$), preferably introduced as a gas. The reaction can be initiated by an external source, such as by light, or it can be spontaneous. In the case of fluorine, the reaction takes place as follows:

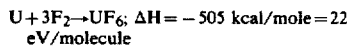

The heat of reaction is sufficient to insure that the $UF_6$ molecules are created in excited states. The excited molecules then pass through the optical cavity 34 including resonators 36, and can also include a fine tuning device such as a Fabry-Perot etalon (not shown). The optical cavity is tuned to an optical transition for which a population inversion exists and more specifically is tuned to favor one isotopic species in preference to another by taking advantage of the difference in transition frequencies of different isotopic species. The transition frequencies can be the 16 μm vibrational frequencies, or any of a number for which relatively large isotope shifts exist. The optical feedback provided by the resonators preferentially de-excites one or more of the species, leaving the other species excited.

The molecules then pass into region 38 where further processing effects physical separation. This subsequent processing can include any of a number of procedures, for example, the excited molecules can be photoionized or photo-dissociated by irradiation with light with a frequency sufficient to ionize or dissociate the molecules in a vibrationally excited state but insufficient to ionize or dissociate the molecules in a ground state. The photoionized molecules can then be physically separated from the other molecules by suitable application of electric or magnetic fields or by introducing a scavenger compound which combines with the photoionized molecules.

It will be noted that this example reaction is very exothermic, imparting 22 eV per molecule. The molecules thus formed will therefore encompass a broad range of excited states. While such excitation provides many transitions among which suitable transitions are present having large isotope shifts, reasonable metastable lifetimes and adequate transition probabilities, it will be recognized that many transitions will occur with overlapping energies, thereby making a high degree of optical selectivity difficult. Under such circumstances the invention can desirably be utilized with less energetic reactions, such as that provided in the following example.

EXAMPLE

A useful and less energetic reaction is the hydrolysis of $UF_6$ by water vapor:

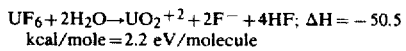

Here the $UF_6$, including $U^{238}$ and $U^{235}$, and water replace the fuel and combustant of previous examples. However, the sequence of processing steps is basically similar. The $UO_2^{+2}$, which is initially formed as a vapor, passes into chamber 34 where resonators 36 selectively de-excite one of the isotopic species of $UO_2$, such as $U^{235}O_2$. The remaining steps are similar to those illustrated above.

In each of the previous examples the physical conditions of the gases leaving the de-excitation chamber 22 in FIG. 3 or 34 in FIG. 5 can influence the overall yield of isotopic enrichment obtained in the final step. Specifically, once one of the species is selectively de-excited, or selectively left in the excited state, it is desirable to prevent the exchange of internal energy of the molecules or atoms or ions of the selected species with similar molecules, atoms or ions of the unselected isotopic species. Such exchange of energy can be prevented by reducing, to the maximum extent possible, collisions between the two species. Methods for doing this are well known in the art and include, among many, such provisions as keeping the pressure suitably low, or by using an inert buffer gas, or by maintaining a high flow, preferably supersonic, or for example, by cooling the gas through adiabatic expansion. Such expansion can be accomplished in a mixture, $CO_2$—$N_2$ for example, by injecting the $CO_2$ into chamber 12 through expansion nozzles 13, located at the entrance to chamber 12 as shown in FIG. 3. Where cooling by adiabatic expansion is not possible, other means of lowering the collision probability among isotopic species can be used, such as operating at suitably low pressures, using a buffer gas, or injecting a cold buffer gas at an appropriate position in the flow stream. It is understood that any or all of the above methods may be used where appropriate with any of the methods disclosed in this invention.

It will be evident that the invention disclosed herein can advantageously be applied to the separation of a large number of isotopes. Some non-limiting useful isotopes which, in addition to uranium, have demonstrated laser action in reactions with either fluorine or oxygen include lithium, gold, copper, magnesium, titanium, carbon, iron, nickel, and platinum. Others to which the invention is believed to be suitably applicable include boron, aluminum, beryllium, thorium, and zirconium, as well as many others such as the halogens and calcogenides.

There has therefore been disclosed an improved system for isotopic and molecular separation. It represents a substantial improvement over the prior art since it requires substantially less power for excitation and an external laser is not required. Use of a high power laser for selective de-excitation should however, provide very high throughputs. The system also takes advantage of presently existing technologies and apparatus.

It will be apparent that many modifications and additions are also possible. It therefore is to be understood that within the scope of the appended claims the invention may be practiced other than as specifically described.

I claim:

1. A method for differentially exciting a selected isotopic species in a mixture of isotopic species comprising:
   a. placing substantially said entire isotopic mixture in an excited gaseous state; and then
   b. selectively de-exciting a preselected isotopic species in said mixture through stimulated emission.

2. A method for separating a selected isotopic species in a mixture of isotopic species comprising:
   a. placing substantially said entire isotopic mixture in an excited gaseous state; then
   b. selectively de-exciting a preselected isotopic species in said mixture through stimulated emission; and then
   c. permanently separating said de-excited species from said excited species.

3. The method of claim 2 wherein said selective de-excitation step comprises selectively irradiating said preselected isotope with laser irradiation.

4. Apparatus for separating a selected isotopic species from a mixture of isotopic species comprising:
   a. means for placing said mixture in an excited gaseous state;
   b. means for selectively de-exciting said previously excited selected species; and
   c. means for permanently separating said de-excited species from the balance of said excited mixture.

5. A method for separating a selected isotopic species in a mixture of isotopic species comprising:
   a. placing substantially said entire isotopic mixture in an excited gaseous state through a combustion reaction;
   b. selectively de-exciting a preselected isotopic species through stimulated emission; and
   c. permanently separating said de-excited species from said excited species.

6. A method for separating a selected isotopic species in a mixture of isotopic species comprising:
   a. placing substantially said entire isotopic mixture in an excited gaseous state through photoexcitation;
   b. selectively de-exciting a preselected isotopic species through stimulated emission; and
   c. permanently separating said de-excited species from said excited species.

7. A method for separating a selected isotopic species in a mixture of isotopic species comprising:
   a. placing substantially said entire isotopic mixture in an excited gaseous state by an exothermic chemical reaction;
   b. selectively de-exciting a preselected isotopic species through stimulated emission; and
   c. permanently separating said de-excited species from said excited species.

8. A method for separating a selected isotopic species in a mixture of isotopic species comprising:
   a. placing substantially said entire isotopic mixture in an excited gaseous metastable state which substantially constitutes a population inversion;
   b. selectively de-exciting a preselected isotopic species through stimulated emission; and
   c. permanently separating said de-excited species from said excited species.

9. A method for separating a selected isotopic species in a mixture of isotopic species comprising:
   a. placing substantially said entire isotopic mixture in an excited gaseous state;
   b. selectively de-exciting a preselected isotopic species by passing said mixture through selectively tuned optical resonators; and
   c. permanently separating said de-excited species from said excited species.

10. A method for separating a selected isotopic species in a mixture of isotopic species comprising:
    a. placing substantially said entire isotopic mixture in an excited gaseous state through electric discharge;
    b. selectively de-exciting a preselected isotopic species through stimulated emission; and
    c. permanently separating said de-excited species from said excited species.

11. Apparatus for separating a selected isotopic species from a mixture of isotopic species comprising:
    a. combustion means for placing said mixture in an excited gaseous state;
    b. means for selectively de-exciting said selected species; and
    c. means for permanently separating said de-excited species from the balance of said excited mixture.

12. Apparatus for separating a selected isotopic species from a mixture of isotopic species comprising:
    a. photoexcitation means for placing said mixture in an excited gaseous state;
    b. means for selectively de-exciting said selected species; and
    c. means for permanently separating said de-excited species from the balance of said excited mixture.

13. Apparatus for separating a selected isotopic species from a mixture of isotopic species comprising:
    a. means for chemically reacting said mixture, exothermally, so as to place said mixture in an excited gaseous state;
    b. means for selectively de-exciting said selected species; and
    c. means for permanently separating said de-excited species from the balance of said excited mixture.

14. Apparatus for separating a selected isotopic species from a mixture of isotopic species comprising:
    a. means for placing said mixture in an excited gaseous metastable state which substantially constitutes a population inversion;
    b. means for selectively de-exciting said selected species; and
    c. means for permanently separating said de-excited species from the balance of said excited mixture.

15. Apparatus for separating a selected isotopic species from a mixture of isotopic species comprising:
    a. means for placing said mixture in an excited gaseous state;

b. selectively tuned optical resonators for selectively de-exciting said selected species; and
c. means for permanently separating said de-excited species from the balance of said excited mixture.

16. Apparatus for separating a selected isotopic species from a mixture of isotopic species comprising:

a. electric discharge means for placing said mixture in an excited gaseous state;
b. means for selectively de-exciting said selected species; and
c. means for permanently separating said de-excited species from the balance of said excited mixture.

* * * * *